United States Patent
Atkinson et al.

(10) Patent No.: US 9,895,726 B1
(45) Date of Patent: Feb. 20, 2018

(54) METHOD FOR CLEANING A FOOD WASTE RECYCLING BIN OF A FOOD WASTE RECYCLING APPLIANCE

(71) Applicant: Whirlpool Corporation, Benton Harbor, MI (US)

(72) Inventors: Wade Alan Atkinson, Benton Harbor, MI (US); Thomas A. Latack, Baroda, MI (US); Andrew Roth, Saint Joseph, MI (US); Joseph Gregory, Benton Harbor, MI (US); Rachel Maghas, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/220,490

(22) Filed: Jul. 27, 2016

(51) Int. Cl.
| | | |
|---|---|---|
| *B08B 9/00* | (2006.01) | |
| *B08B 9/08* | (2006.01) | |
| *B08B 7/00* | (2006.01) | |

(52) U.S. Cl.
CPC .............. *B08B 9/08* (2013.01); *B08B 7/0092* (2013.01)

(58) Field of Classification Search
CPC ................................. B08B 9/08; B08B 7/0092
See application file for complete search history.

(56) References Cited

U.S. PATENT DOCUMENTS

| | | |
|---|---|---|
| 5,174,042 A | 12/1992 | Tomizawa et al. |
| 2003/0062065 A1 | 4/2003 | Lachawiec, Jr. et al. |
| 2016/0178278 A1* | 6/2016 | Chang ........................ F26B 5/04 34/266 |
| 2016/0207845 A1 | 7/2016 | Delgado et al. |
| 2017/0260111 A1* | 9/2017 | Maghas ................ C05F 17/027 |

FOREIGN PATENT DOCUMENTS

| | | |
|---|---|---|
| CA | 2009437 C | 12/2001 |
| CN | 201447432 U | 5/2010 |
| CN | 204325160 U | 5/2015 |
| EP | 0394729 A2 | 10/1990 |
| WO | 9429241 | 12/1994 |
| WO | 0140140 A1 | 1/2001 |
| WO | WO2014198795 | * 12/2014 |

OTHER PUBLICATIONS

Machine Translation of Application No. IN1140/KOL/2015A, Method for the Sterilization of Foodstuffs, Especially for Spices, The Patent Office Journal, Publication date Aug. 26, 2016, pp. 1-11.*
European Search Report for Counterpart EP171604432, Dated Aug. 23, 2017.

* cited by examiner

*Primary Examiner* — Sharidan Carrillo

(57) ABSTRACT

A method for cleaning a food waste recycling bin of a food waste recycling appliance includes maintaining between a lower portion and an upper portion of the food waste recycling bin a temperature differential sufficient such that water vapor is emitted from waste located in the lower portion of the food waste recycling bin.

17 Claims, 5 Drawing Sheets

METHOD FOR CLEANING A FOOD WASTE RECYCLING BIN OF A FOOD WASTE RECYCLING APPLIANCE

BACKGROUND

Food waste recycling appliances are known to implement a food waste recycling cycle for biologically and chemically decomposing organic material, such as food waste, into recycled food waste for use as a fertilizer and soil amendment. The food waste recycling cycle can be implemented in a food waste recycling bin by providing water, heat and aeration to the waste, and can require a period of time for completion. During these cycles, a layer of waste can accumulate on the side walls of the food waste recycling bin, particularly in the upper portion of the food waste recycling bin, above the level of the waste within the food waste recycling bin.

BRIEF SUMMARY

The invention relates to a method for cleaning a food waste recycling bin of a food waste recycling appliance. The method comprises maintaining between a lower portion and an upper portion of a food waste recycling bin a temperature differential sufficient such that water vapor emitted from waste located in a lower portion of the food waste recycling bin during food waste recycling condenses on the upper portion.

DETAILED DESCRIPTION

Figure 1:
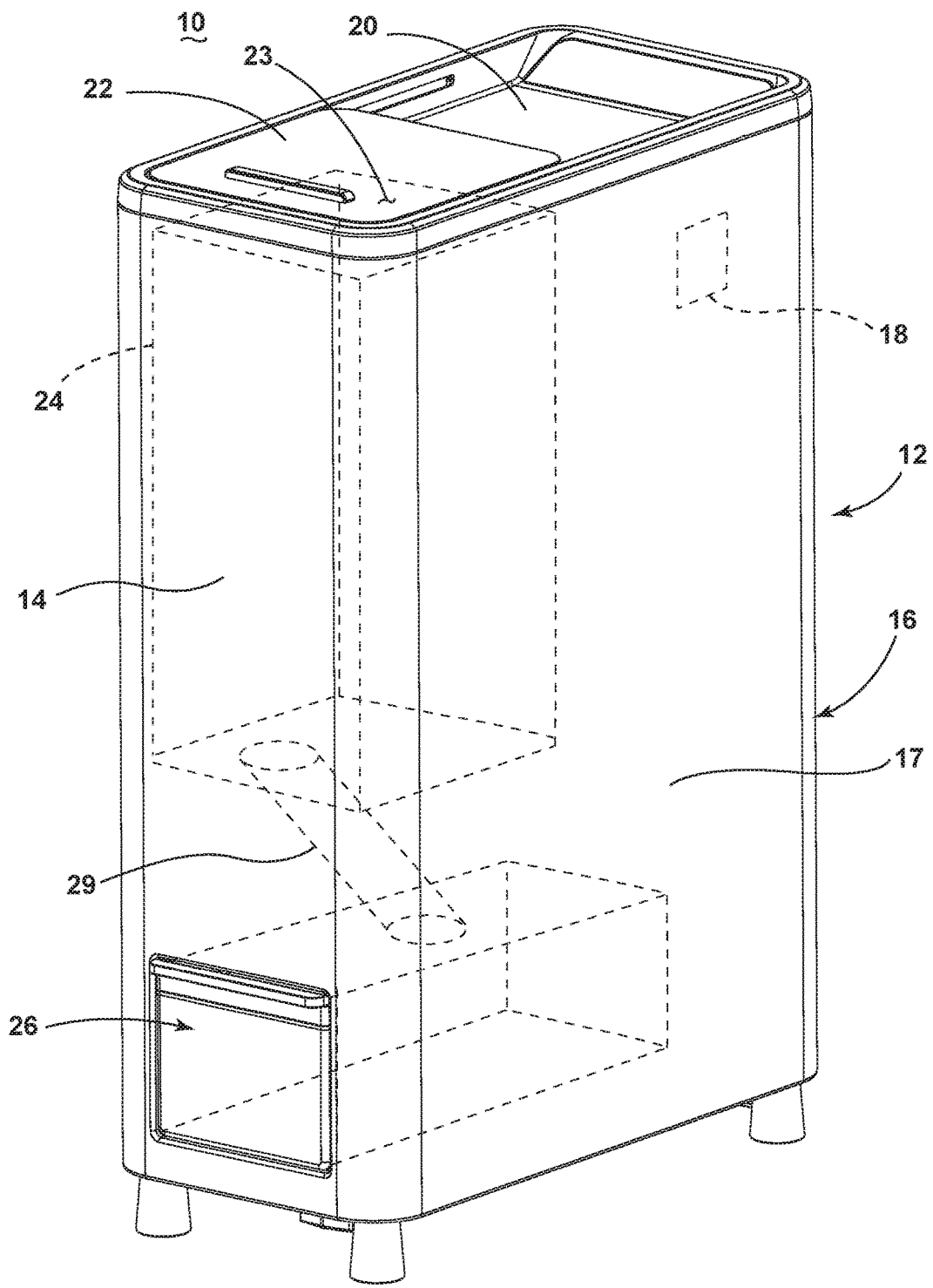
FIG. 1 is a perspective view of a food waste recycling appliance.

FIG. 1 illustrates a perspective view of a food waste recycling appliance 10 or food waste recycler for transforming organic material into recycled food waste by way of a food waste recycling cycle of operation. While a "food waste recycling appliance" or "food waste recycler" is described, embodiments of the invention can be equally applicable for similar devices, such as composters or biological waste digesters. The food waste recycling appliance 10 can include a housing 12 defining an interior having a front wall 14 spaced from a back wall 16, a pair of side walls 17, and a controller 18 located within the housing 12.

A top wall 20 can enclose the housing 12 at the top of the front wall 14, back wall 16, and the pair of side walls 17. The housing 12 can be any structure for enclosing, supporting and protecting the electrical and mechanical components of the food waste recycling appliance 10 including, but not limited to a cabinet with a frame.

The top wall 20 can include a door 22 slidably mounted to a portion of the top wall 20 for sliding movement between opened or closed positions to enable access to interior components of the food waste recycling appliance 10. The door 22 can be any barrier that provides selective access for inputting organic material into the food waste recycling appliance 10, including, but not limited to a hingedly, slidably or removably mounted cover, drawer, panel or lid. While shown in FIG. 1 as coupled to the top wall 20, the door 22 can be mounted to any exterior wall enclosing the housing 12, including, but not limited to, the front wall 14.

The top wall 20, as well as the remainder of the housing 12, can be formed of any material suitable for construction of the housing structure including, but not limited to, metal such as steel or steel alloy, plastic, composite materials such as a hardened polymer composite material and combinations thereof. Some models of food waste recycling appliances 10 can include decorative panels that can be mounted on the housing 12 or one or more walls.

When in the opened position, the door 22 provides access to the interior of the housing 12. In the opened position, the door 22 can further expose any element of the food waste recycling appliance 10 interior of the housing 12, including, but not limited to, one or more water fill inlets for supplying water to the food waste recycling appliance 10 and one or more enzyme dispenser inlets. A food waste recycling bin 24 is provided within the housing 12 and includes a fill opening 23. The food waste recycling bin 24 can be disposed beneath the door 22 such that the door 22 provides selective access to the fill opening 23 of the food waste recycling bin 24 as the door 22 is opened/closed.

An access drawer 26 is provided and is selectively removable from the housing 12 through an opening in the front wall 14. The access drawer 26 is a drawer removably mounted to the housing 12 such that selective access to the interior of the access drawer 26 is permitted. The access drawer 26 can be provided with a latch (not shown) that holds the access drawer 26 in a closed position. The latch (not shown) can be opened at will by a user in order to allow the access drawer 26 to be removed from the housing 12. It will be understood that access to the interior of the food waste recycling appliance 10 via the front wall 14 can be provided in any suitable way, including, but not limited to, a door slidably or pivotally connected to the front wall 14. The access drawer can be detachably mounted to an internal side of the housing 12 and is accessible from outside the housing 12. The access drawer 26 can be removable from the interior of the housing 12 so that the contents thereof can be discharged at will by a user, as, for example, by dumping the contents of the drawer 26 onto a garden.

Operation of the food waste recycling appliance 10 can be conventional and is not critical to the embodiments disclosed herein. For example, a conduit 29 can extend between the food waste recycling bin 24, such as from a lower portion of the food waste recycling bin 24, and the access drawer 26. Embodiments of the disclosure can optionally include a transfer mechanism disposed inside the conduit 29 that is capable of assisting the transfer of material from the food waste recycling bin 24 to the access drawer 26. Examples of such a transfer mechanism can include, but are not limited to, a rotatable auger, a conveyor, a gravitational chute, and the like.

A complete cycle of operation can include receiving organic material into the food waste recycling bin 24, mixing the organic material within the food waste recycling bin 24 while simultaneously drying the organic material, and then transferring the organic material to the access drawer 26 after which the recycled organic material can be removed. Suitable mechanisms for a complete cycle of operation for the food waste recycling appliance are set forth in detail in U.S. patent application Ser. No. 15/064,969, filed Mar. 9, 2016, and titled "Method and Apparatus for Operating a Composter Device," which is incorporated herein by reference in its entirety.

Figure 2:
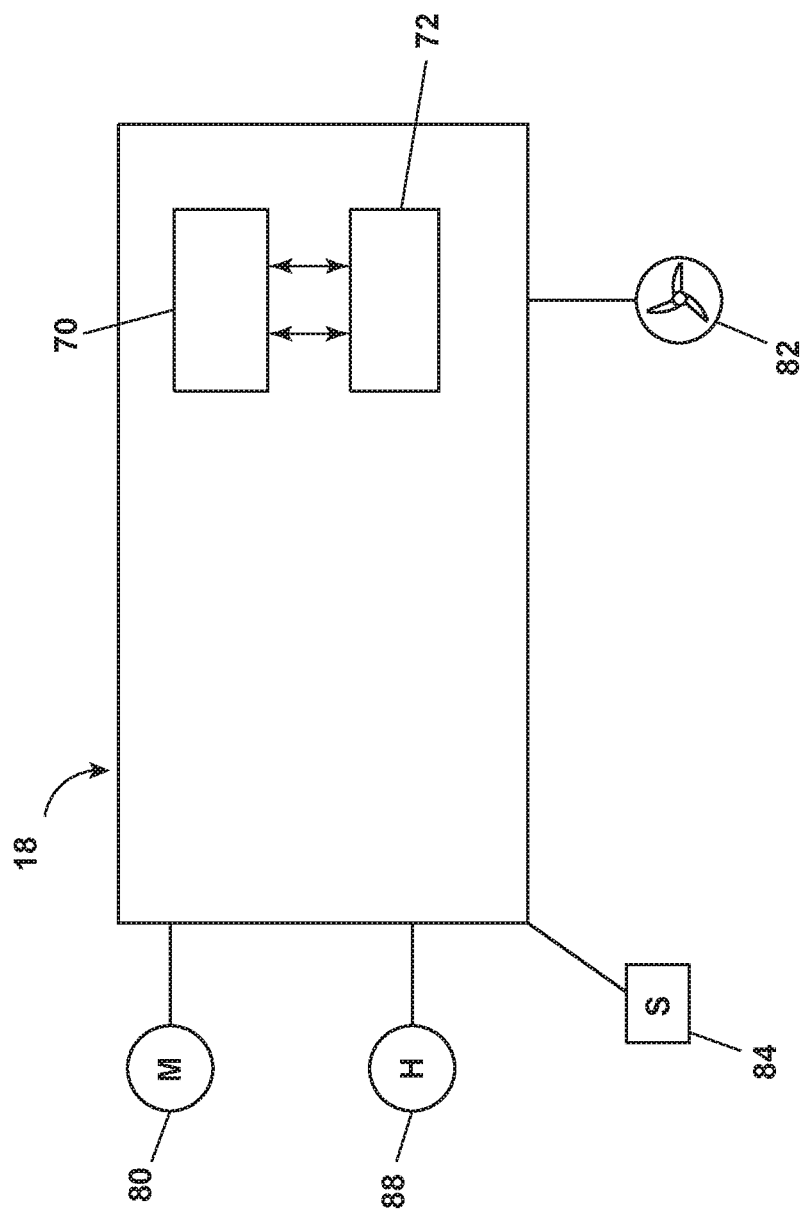
FIG. 2 is a block diagram of a control system of the food waste recycling appliance.

Referring now to FIG. 2, a schematic of the controller 18 for controlling the operation of the food waste recycling appliance 10 is illustrated. The controller 18 can be provided with a memory 70 and a central processing unit (CPU) 72. The memory 70 can be used for storing the control software that is executed by the CPU 72 in completing a cycle of operation using the food waste recycling appliance 10 and any additional software. The memory 70 can also be used to store information, such as a database or table, and to store data received from one or more components of the food waste recycling appliance 10 that can be communicably coupled with the controller 18.

The controller 18 can be operably coupled with one or more components of the food waste recycling appliance 10 for communicating with and controlling the operation of the component to complete a cycle of operation. For example, the controller 18 can be operably coupled with a motor 80 to control the operation of the motor 80. In another example, the controller 18 can be operably coupled to a fan 82. The controller 18 can also be coupled with the one or more sensors 84 provided in one or more of the systems of the food waste recycling appliance 10 to receive input from the sensors. The controller 18 can also be operably coupled to a heating element 88 to control the operation of the heating element 88 to selectively apply heat to at least a portion of the food waste recycling bin 24.

Figure 3:
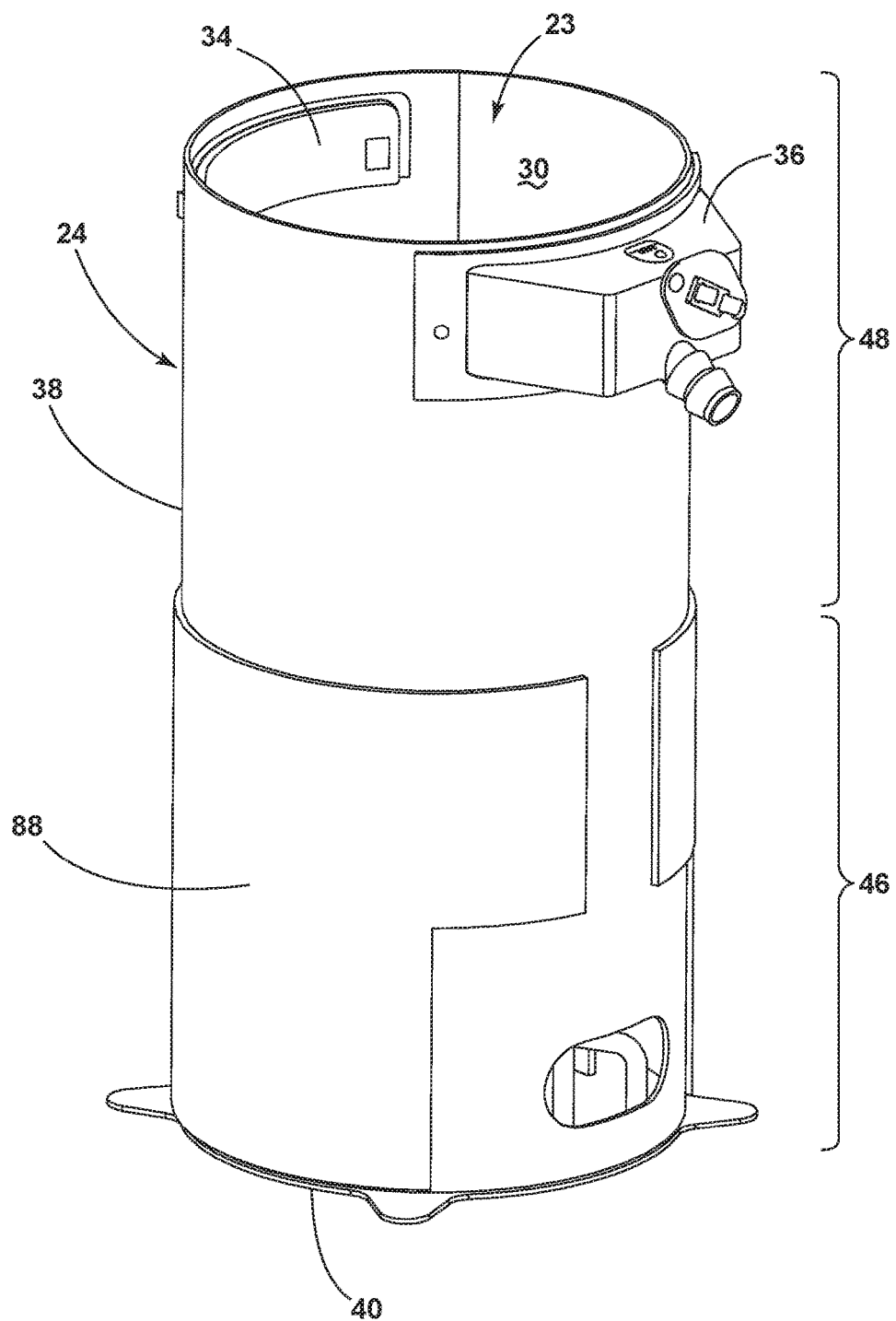
FIG. 3 is a perspective view of a food waste recycling bin for use in the food waste recycling appliance of FIG. 1.

FIG. 3 illustrates a perspective view of a food waste recycling bin 24 for use in the food waste recycling appliance 10 according to an embodiment of the invention. The food waste recycling bin 24 can be fixedly or removably mounted to the housing 12. The food waste recycling bin 24 can have a cylindrical side wall 38 connected to a base 40. The side wall 38 and base 40 define an interior 30 configured to receive organic material through the fill opening 23 from outside of the food waste recycling appliance 10, either directly or indirectly. The fill opening 23 can receive refuse through the top wall 20 of the food waste recycling appliance 10. The top wall 20 can also include a funnel (not shown) located to align with the fill opening 23 of the food waste recycling bin 24 such that refuse placed in through the top wall 20 into the funnel is guided into the interior 30 of the food waste recycling bin 24. The inner surface of the food waste recycling bin 24 can be provided with a non-stick coating in order to promote the release of the food material from the inner surfaces of the side wall 38 and the base 40. Any suitable non-stick coating can be used, non-limiting examples of which include commercially available coatings, such as Xylan®, available from Whitford Corporation.

A reducing mechanism, illustrated herein as a rotating mixer 32 (FIG. 4) can be provided within the food waste recycling bin 24. The reducing mechanism could also be provided in the form of an auger, a grinding wheel, a grinding blade, any chopping mechanism, or any like device or combination thereof that grinds, shears, chops, mixes, breaks, or otherwise reduces the particles sizes of refuse by the operation of the reducing mechanism or uniformly mixing refuse with water, air, or enzymes that can be introduced in the food waste recycling bin 24 for transforming the refuse into recycled food waste.

The food waste recycling bin 24 can also be provided with an air inlet 34 and an exhaust outlet 36. The air inlet 34 and exhaust outlet 36 can be provided opposite one another at an upper portion 48 of the side wall 38 adjacent to the fill opening 23. In an exemplary embodiment, the air inlet 34 and exhaust outlet 36 are provided 180° opposite one another along the cylindrical side wall 38. The air inlet 34 is configured to allow cool ambient air to enter the interior 30 of the food waste recycling bin 24 and direct the ambient air downward into the food waste recycling bin 24. The exhaust outlet 36 is configured to allow warm exhaust air to exit the interior 30 of the food waste recycling bin 24.

The food waste recycling bin 24 can also be provided with a heating element 88. The heating element 88 can be provided circumferentially about an outer surface of the side wall 38 of the food waste recycling bin 24. It will also be understood that the heating element 88 can be provided adjacent the side wall 38 of the food waste recycling bin 24 in any other suitable arrangement, including in a manner that the heating element 88 is not circumferential about the food waste recycling bin 24. In an exemplary embodiment, the heating element 88 is provided about a lower portion 46 of the food waste recycling bin 24, having a height that is generally equivalent to the height of the mixer 32 within the food waste recycling bin 24. In an exemplary embodiment, there is at least an upper portion 48 of the food waste recycling bin 24 that does not receive heat from the heating element 88. The upper portion 48 that is not heated can be any suitable height such that the upper portion 48 can provide a condensation surface within the food waste recycling bin 24. Non-limiting examples of such a satisfactory height for the upper portion 48 can include one third, one half, or two thirds of the total height of the food waste recycling bin 24. The heating element 88 can be controllably operated to maintain the temperature in at least a lower portion 46 of the food waste recycling bin 24 within a predetermined temperature range. The predetermined temperature range can vary with the progress of the food waste recycling process, and the temperature can be determined by a temperature sensor (not shown). The heating element 88 can be any suitable type of heating mechanism to provide heat to both the food waste recycling bin 24 and the contents of the food waste recycling bin 24, non-limiting examples of which include a blanket heater or a film heater.

Figure 4:
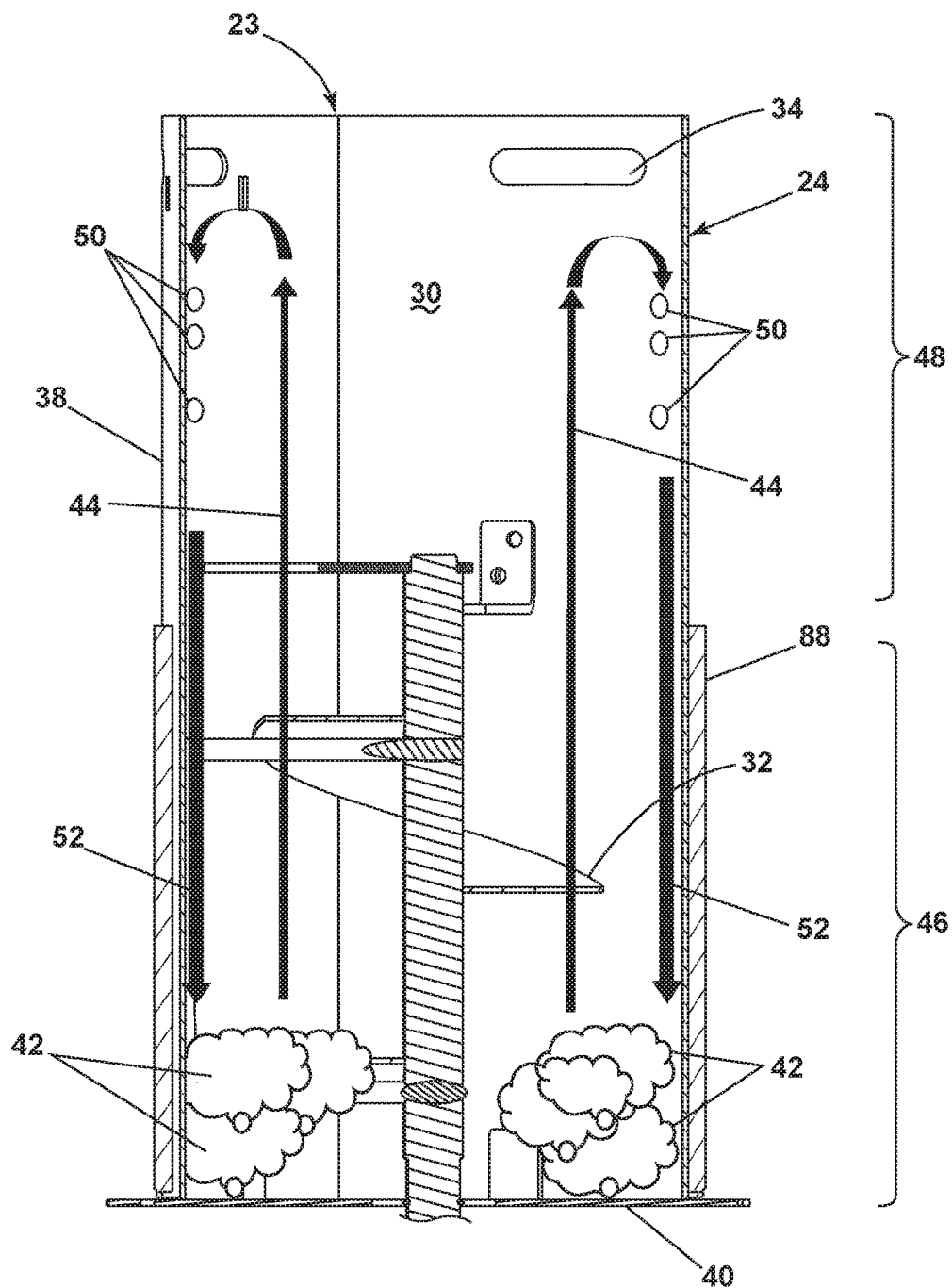
FIG. 4 is a schematic cross-sectional illustration of the food waste recycling bin of FIG. 3.

Turning now to the operation of the food waste recycling appliance 10, FIG. 4 illustrates a schematic cross-sectional illustration of a method of cleaning the food waste recycling bin 24 according to an embodiment of the invention. During a cycle of operation of the food waste recycling appliance 10, the heating element 88 can be activated by the controller 18 to selectively apply heat to the lower portion 46 of the food waste recycling bin 24 in order to maintain a temperature of the lower portion 46 of the food waste recycling bin 24 at a predetermined temperature. In an exemplary embodiment, the predetermined temperature can be in the range of 75° C. (167° F.). It will be further understood that the predetermined temperature can be any suitable temperature and also that the predetermined temperature can vary with the progress of the food waste recycling process during a cycle of operation. During the food waste recycling process, as heat is applied to the lower portion 46 of the food waste recycling bin 24 by the heating element 88, water vapor is emitted from waste 42 that is located in the interior 30 of the food waste recycling bin 24. The heated water vapor that is emitted from the waste 42 will then rise upwards within the interior 30 of the food waste recycling bin 24, following the path of the arrow 44.

The heating of the lower portion 46 of the food waste recycling bin 24 and the flowing of cooling ambient air through the air inlet 34 within the upper portion 48 of the food waste recycling bin 24 results in a temperature differential being maintained between the upper portion 48 and the lower portion 46 of the food waste recycling bin 24. It will be understood that the ambient air need not be cooled to fall within the scope of the disclosure. While the heating of the lower portion 46 of the food waste recycling bin 24 is the primary function of the invention, the supplying of cooling air can serve as an enhancement to the effect of the heating, but is not a required component. It will be further understood that the temperature differential between the upper portion 48 and the lower portion 46 can be any temperature differential such that the upper portion 48 is maintained at a lower temperature than the lower portion 46 of the food waste recycling bin 24. As the water vapor rises within the interior 30 of the food waste recycling bin 24, the water vapor comes into contact with the unheated upper portion 48, as well as the cooling ambient air that enters the interior 30 of the food waste recycling bin 24 through the air inlet 34. This reduction in temperature of the air within the food waste recycling bin 24 causes condensation, or excess moisture or water vapor, to fall out of or condense from the air, gathering as liquid condensate on the inner surface of the upper portion 48 of the food waste recycling bin 24, illustrated as water 50. It will be understood that the temperature of the upper portion 48 of the food waste recycling bin 24 can be any suitable temperature such that the temperature is below the dew point of the water vapor released from the waste 42.

Once the water 50 has gathered in the upper portion 48 of the food waste recycling bin 24, at least partially above the level of the mixer 32, it is gravitationally driven to run down the interior surface of the side wall 38 of the food waste recycling bin 24, along the path indicated by arrows 52. As the water 50 runs down the side wall 38 in the direction of the arrows 52, the water 50 can serve to rehydrate and dislodge any remaining waste on the side wall 38 and rinse the side wall 38 in the upper portion 48 of the interior 30, above the level of the mixer 32. While the condensate is illustrated herein as "water," it will be understood that examples in which the water 50 is not pure water, and can include amounts of recycled food waste, odor, and/or bacteria, will also fall within the scope of the invention.

Figure 5:
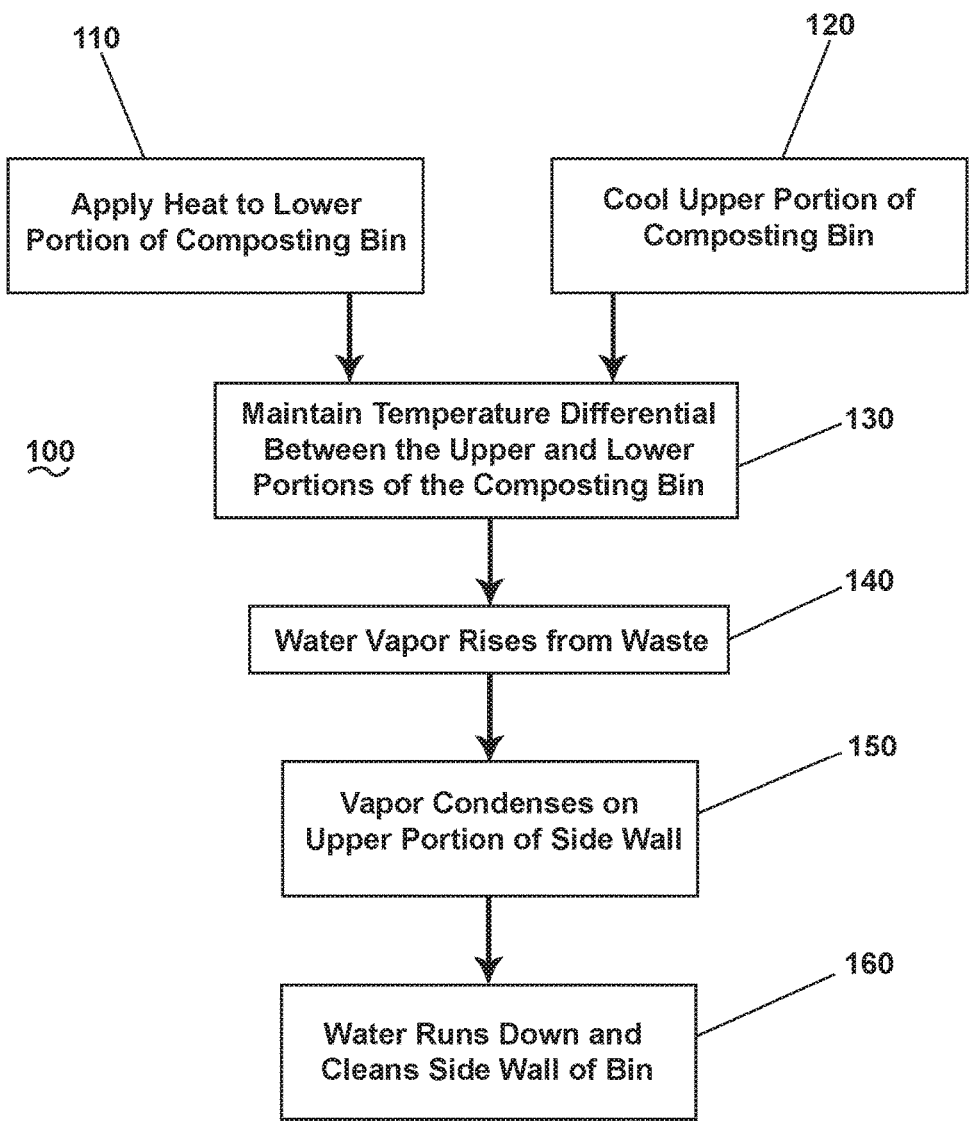
FIG. 5 is a flowchart illustrating a method of cleaning the food waste recycling bin of FIG. 4.

FIG. 5 illustrates a method 100 of cleaning the food waste recycling bin 24 of the food waste recycling appliance 10. In simultaneous first steps 110, 120 heat is applied to the lower portion 46 of the food waste recycling bin 24 in step 110, while the upper portion 48 of the food waste recycling bin 24 is cooled in step 120. The cooling of the upper portion 48 of the food waste recycling bin 24 in step 120 can be any sufficient action that results in the dew point being reduced in the upper portion 48 of the food waste recycling bin 24. In an exemplary embodiment, the dew point of the upper portion 48 of the food waste recycling bin 24 is reduced by flowing ambient or cooling air into the upper portion 48 through the air inlet 34. The execution of steps 110, 120 results in a second step 130, wherein the method 100 includes maintaining a temperature differential between the upper portion 48 and lower portion 46 of the food waste recycling bin 24. In a third step 140, water vapor is released from the waste 42 and rises upwardly within the interior 30 of the food waste recycling bin 24, from the lower portion 46 to the upper portion 48. In a fourth step 150, the water vapor condenses as water 50 on the side wall 38 of the upper portion 48 of the food waste recycling bin 24 due to the temperature differential that is maintained. In a fifth step 160, the water 50 runs down the side wall 38, rehydrating and dislodging waste 42 that may remain on the side wall 38, especially above the level of the mixer 32.

The sequence depicted is for illustrative purposes only and is not meant to limit the method 100 in any way as it is understood that the portions of the method can proceed in a different logical order, additional or intervening portions can be included, or described portions of the method can be divided into multiple portions, or described portions of the method can be omitted without detracting from the described method.

While examples of reducing the dew point in the upper portion 48 of the food waste recycling bin 24 have been described as being accomplished by reducing the temperature in the upper portion 48, additional or alternative methods can be included, and embodiments of the disclosure are not limited to only those examples provided. Likewise, embodiment of the disclosure can include additional or alternative target characteristics, such as reducing the air temperature within the upper portion 48 of the food waste recycling bin 24, or reducing the humidity within the upper portion 48 of the food waste recycling bin 24.

The embodiments disclosed herein provide a method for cleaning a food waste recycling bin of a food waste recycling appliance. One advantage that can be realized in the above embodiments is that the above described embodiments are configured to provide a food waste recycling bin for a food waste recycling appliance that is capable of self-cleaning during the course of a normal food waste recycling cycle of operation. Because the level of the mixer and the level of the waste within the food waste recycling bin generally does not extend the full height of the food waste recycling bin, the side walls in the upper portion of the food waste recycling bin are often not effectively cleaned, and a layer of waste can remain on these walls. By executing the method for cleaning the food waste recycling bin disclosed herein, the upper portion of the side wall of the food waste recycling bin can be maintained in a cleaner state, without requiring additional action by a user.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

This written description uses examples to disclose embodiments of the invention, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for cleaning a food waste recycling bin holding food waste and having a peripheral wall with an inner surface defining an interior with a closed bottom defining a lower portion and having an open top defining an upper portion, of a food waste recycling appliance, the method for cleaning comprising:

exposing the open top to ambient air and heating the lower portion to heat the food waste to generate a temperature differential between the lower and upper portion causing water vapor emitted from food waste located in the lower portion to condense on the inner surface of the peripheral wall within the interior along the upper portion to form a condensate cleaning the inner surface of the peripheral wall.

2. The method of claim 1 further comprising rotating a mixer in the food waste recycling bin.

3. The method of claim 1 further comprising reducing the a dew point in the upper portion of the food waste recycling bin.

4. The method of claim 1 wherein the heating the lower portion comprises applying heat to maintain a temperature of the lower portion at a predetermined temperature.

5. The method of claim 1 further comprising flowing cooling air through the upper portion of the food waste recycling bin.

6. The method of claim 1 wherein maintaining the temperature differential comprises cooling the upper portion of the food waste recycling bin.

7. The method of claim 2 wherein at least a portion of the condensing occurs above the mixer.

8. The method of claim 3 wherein reducing the dew point comprises at least one of reducing a temperature of the upper portion of the food waste recycling bin, reducing an air temperature within the upper portion of the food waste recycling bin, or reducing a humidity within the upper portion of the food waste recycling bin.

9. The method of claim 3 wherein reducing the dew point comprises flowing the ambient air into the upper portion of the food waste recycling bin.

10. The method of claim 4 wherein the predetermined temperature is about 167 degrees Fahrenheit.

11. The method of claim 7 further comprising flowing the ambient air through an air inlet into the upper portion of the food waste recycling bin.

12. The method of claim 11 further comprises heating the lower portion of the food waste recycling bin with a controller.

13. The method of claim 11 wherein the heating the lower portion comprises applying heat to maintain a temperature of the lower portion at a predetermined temperature.

14. The method of claim 4 wherein maintaining the temperature differential comprises cooling the upper portion of the food waste recycling bin.

15. The method of claim 13 wherein the predetermined temperature is about 167 degrees Fahrenheit.

16. A method for cleaning a food waste recycling bin holding food waste and having a peripheral wall with an inner surface defining an interior with a closed bottom defining a lower portion and having an open top defining an upper portion, of a food waste recycling appliance, the method for cleaning comprising:

exposing the open top to ambient air and heating the lower portion to heat the food waste to generate a temperature differential between the lower and upper portion causing water vapor emitted from food waste located in the lower portion to condense on the inner surface of the peripheral wall within the interior along the upper portion to form a condensate; and continuing the heating to form an amount of condensate on the upper portion of the food waste recycling bin that runs down an interior surface of a side wall of the food waste recycling bin to clean the interior of the food waste recycling bin.

17. A method for cleaning a food waste recycling bin holding food waste and having a peripheral wall with and inner surface defining an interior with a closed bottom defining a lower portion and having an open top defining an upper portion, of a food waste recycling appliance, the method for cleaning comprising:

exposing the open top to ambient air and heating the lower portion to heat the food waste and cooling the upper portion of the food waste recycling to generate a temperature differential between the lower and upper portion causing water vapor emitted from food waste located in the lower portion to condense on the inner surface of the peripheral wall within the interior along the upper portion to form a condensate; and continuing the heating and the cooling to form an amount of condensate on the upper portion of the food waste recycling bin that runs down an interior surface of a side wall of the food waste recycling bin to clean the interior of the food waste recycling bin.

* * * * *